US009589005B2

(12) United States Patent
Dedeoglu

(10) Patent No.: US 9,589,005 B2
(45) Date of Patent: *Mar. 7, 2017

(54) METHOD, SYSTEM AND COMPUTER PROGRAM PRODUCT FOR STORING A DECISION TREE

(75) Inventor: Goksel Dedeoglu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1031 days.

This patent is subject to a terminal disclaimer.

(21) Appl. No.: 13/439,013

(22) Filed: Apr. 4, 2012

(65) Prior Publication Data

US 2012/0254496 A1 Oct. 4, 2012

Related U.S. Application Data

(60) Provisional application No. 61/471,563, filed on Apr. 4, 2011.

(51) Int. Cl.
*G06F 12/02* (2006.01)
*G06F 17/30* (2006.01)

(52) U.S. Cl.
CPC .. *G06F 17/30327* (2013.01); *G06F 17/30625* (2013.01); *G06F 17/30961* (2013.01); *G06F 12/0207* (2013.01)

(58) Field of Classification Search
CPC ............... G06F 3/0647; G06F 12/0207; G06F 17/30327; G06F 17/30625; G06F 17/30961

USPC ....................... 711/1, E12.078, 165
See application file for complete search history.

(56) References Cited

U.S. PATENT DOCUMENTS

| | | | |
|---|---|---|---|
| 2003/0217234 A1* | 11/2003 | Rowlands | 711/141 |
| 2004/0267785 A1* | 12/2004 | Suontausta et al. | 707/100 |
| 2007/0218938 A1* | 9/2007 | Carter | 455/528 |
| 2010/0174741 A1* | 7/2010 | Shinjo et al. | 707/769 |
| 2013/0179377 A1* | 7/2013 | Oberg et al. | 706/45 |

* cited by examiner

*Primary Examiner* — Reginald Bragdon
*Assistant Examiner* — Mehdi Namazi
(74) *Attorney, Agent, or Firm* — Michael A. Davis, Jr.; Charles A. Brill; Frank D. Cimino

(57) ABSTRACT

At least first nodes and second nodes of a decision tree are stored within a memory of an information handling system. The first nodes include a first parent node and first remaining nodes that descend from the first parent node. The second nodes include a second parent node and second remaining nodes that descend from the second parent node. The first nodes are grouped into a first packed node stored in first physically contiguous locations of the memory. The first nodes are sequenced in the first physically contiguous locations according to respective depth levels of the first nodes within the decision tree. The second nodes are grouped into a second packed node stored in second physically contiguous locations of the memory. The second nodes are sequenced in the second physically contiguous locations according to respective depth levels of the second nodes within the decision tree.

27 Claims, 9 Drawing Sheets

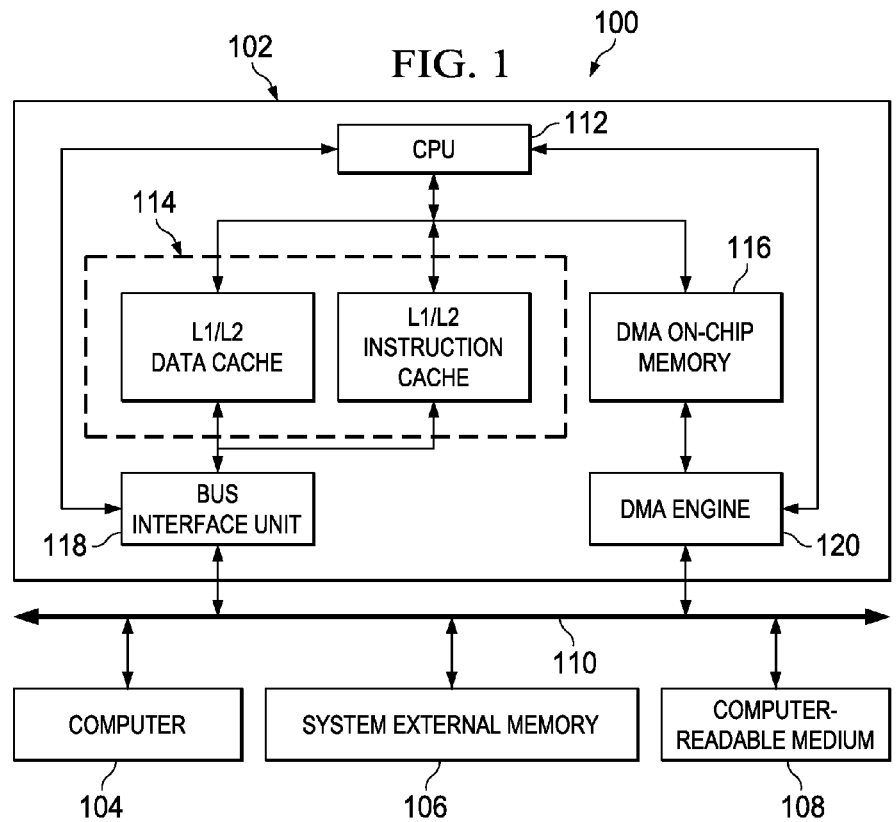
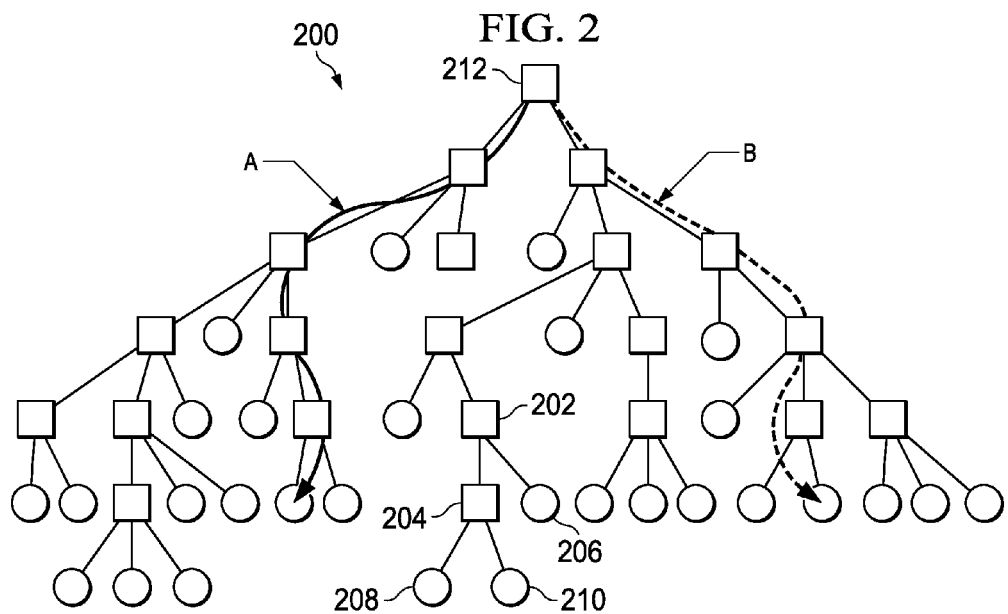

| NODE | DEPTH | TAG |
|---|---|---|
| G | 3 | X |
| H | 3 | X |
| I | 3 | X |
| J | 3 | |
| K | 3 | |
| L | 3 | |
| B | 2 | |
| C | 2 | X |
| D | 2 | |
| E | 2 | |
| F | 2 | |
| A | 1 | |

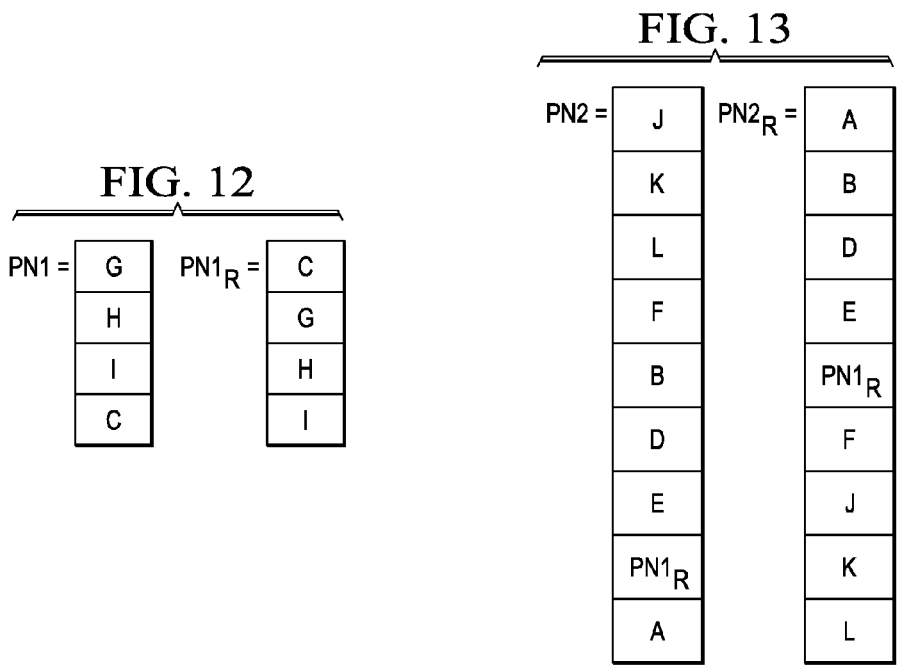
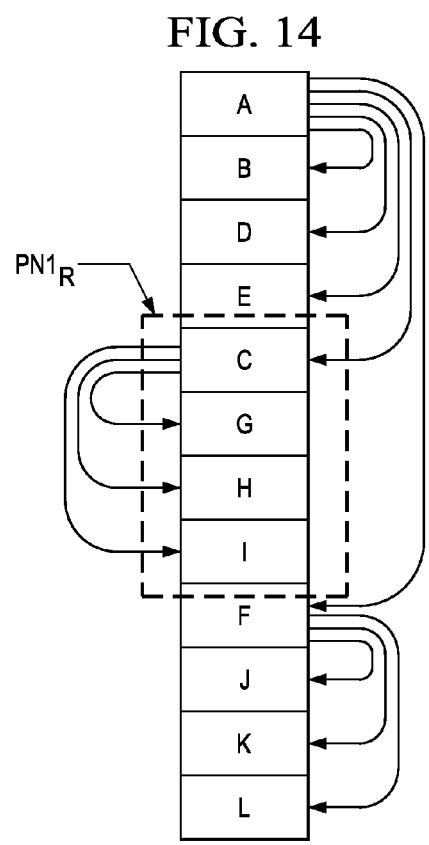

METHOD, SYSTEM AND COMPUTER PROGRAM PRODUCT FOR STORING A DECISION TREE

CROSS-REFERENCE TO RELATED APPLICATION

This application claims priority to U.S. Provisional Patent Application Ser. No. 61/471,563, filed Apr. 4, 2011, entitled ANALYSIS AND ENCODING OF DECISION TREES FOR IMPROVED MEMORY PERFORMANCE, naming Goksel Dedeoglu as inventor.

This application is related to co-owned co-pending U.S. patent application Ser. No. 13/439,129, filed on even date herewith, entitled METHOD, SYSTEM AND COMPUTER PROGRAM PRODUCT FOR READING A DECISION TREE, naming Goksel Dedeoglu as inventor.

All of the above-identified applications are hereby fully incorporated herein by reference for all purposes.

BACKGROUND

The disclosures herein relate in general to information handling systems, and in particular to a method, system and computer program product for storing a decision tree.

A decision tree can be very large. In one example, a decision tree has twenty depth levels and more than 250,000 nodes, occupying at least 10 megabytes of storage. In a wide range of systems (e.g., embedded systems, such as portable electronic devices), a large decision tree might exceed storage limits of either a data cache or a direct memory access ("DMA") on-chip memory. Moreover, evaluation or parsing of a large decision tree might encounter other limits of a system's computational resources. Such limits can reduce efficiency in storing and reading a decision tree, but higher efficiency is desirable.

SUMMARY

At least first nodes and second nodes of a decision tree are stored within a memory of an information handling system. The first nodes include a first parent node and first remaining nodes that descend from the first parent node. The second nodes include a second parent node and second remaining nodes that descend from the second parent node. The first nodes are grouped into a first packed node stored in first physically contiguous locations of the memory. The first nodes are sequenced in the first physically contiguous locations according to respective depth levels of the first nodes within the decision tree. The second nodes are grouped into a second packed node stored in second physically contiguous locations of the memory. The second nodes are sequenced in the second physically contiguous locations according to respective depth levels of the second nodes within the decision tree.

BRIEF DESCRIPTION OF THE DRAWINGS

FIG. 1 is a block diagram of an information handling system of the illustrative embodiment.

FIG. 2 is a diagram of a first decision tree, which is processable by the system of FIG. 1.

FIG. 12 is a diagram of a first packed node of the second decision tree, before and after a reordering step of the first operation of FIG. 3.

FIG. 13 is a diagram of a second packed node of the second decision tree, before and after the reordering step of the first operation of FIG. 3.

FIG. 14 is a diagram of the linked list of memory locations of the second decision tree, after the first operation of FIG. 3.

DETAILED DESCRIPTION

Figure 3:
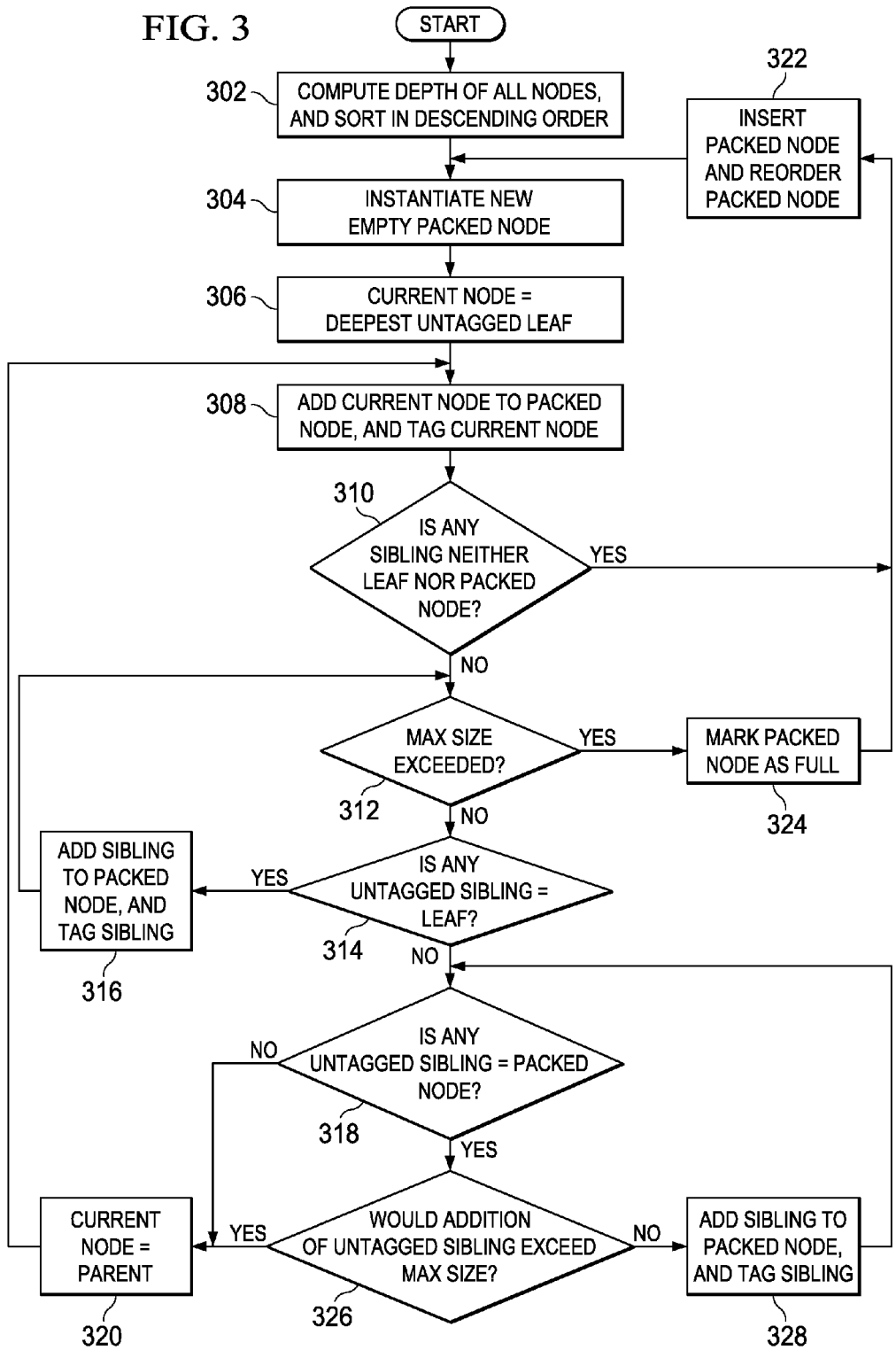
FIG. 3 is a flowchart of a first operation of the system of FIG. 1.

FIG. 1 is a block diagram of an information handling system, indicated generally at 100, of the illustrative embodiment. The system 100 is formed by electronic circuitry components for performing the system 100 operations. In the example of FIG. 1, the system 100 includes a digital signal processor ("DSP") 102, a computer 104, a system external memory 106, and a computer-readable medium 108, which communicate information (e.g., data and instructions) to and from one another through a system bus 110.

The DSP 102 performs its operations in response to instructions of a computer-readable program that is stored on the computer-readable medium 108 (e.g., hard disk drive, flash memory card, or other nonvolatile storage device). Similarly, the computer 104 performs its operations in response to instructions of a computer-readable program that is stored on the computer-readable medium 108. The DSP 102 and the computer 104 read such instructions from the computer-readable medium 108 through the system bus 110.

Similarly, the DSP 102 and the computer 104 are operable to read information from the system external memory 106. For example, such information is stored by the system external memory 106 in response to commands from the DSP 102 and/or the computer 104. The DSP 102 and the computer 104 are operable to output such commands and such information to the system external memory 106 through a system bus 110.

As shown in FIG. 1, the DSP 102 includes a central processing unit ("CPU") 112, a cache memory indicated by dashed enclosure 114, a direct memory access ("DMA") on-chip memory 116, a bus interface unit 118, and a DMA engine 120. The cache memory 114 includes an L1/L2 data cache and an L1/L2 instruction cache. In operation, the CPU 112 outputs signals that command the bus interface unit 118 to: (a) copy information from the system external memory 106 for storage into the L1/L2 data cache; and (b) copy instructions from the computer-readable medium 108 for storage into the L1/L2 instruction cache. Also, the CPU 112 outputs signals that command the DMA engine 120 to copy information from the system external memory 106 for storage into the DMA on-chip memory 116.

The CPU 112 reads: (a) information stored by the L1/L2 data cache; (b) information stored by the DMA on-chip memory 116; and (c) instructions stored by the L1/L2 instruction cache. In response to such information, the CPU 112 executes such instructions. If the CPU 112 modifies such information in the L1/L2 data cache, then the CPU 112 maintains coherency of such information by outputting signals that command the bus interface unit 118 to copy such modified information from the L1/L2 data cache into the system external memory 106. Similarly, if the CPU 112 modifies such information in the DMA on-chip memory 116, then the CPU 112 maintains coherency of such information by outputting signals that command the DMA engine 120 to copy such modified information from the DMA on-chip memory 116 into the system external memory 106.

FIG. 2 is a diagram of a decision tree, indicated generally at 200, which is processable by the system 100. The computer 104 executes a computer program for creating (e.g., building or constructing) the decision tree 200 in response to training examples, according to machine learning rules. Accordingly, the decision tree 200 is useful for data mining and machine learning applications.

The decision tree 200 is a linked list, which includes: (a) leaf nodes ("leafs"), which are shown as circles in FIG. 2; and (b) other nodes, which are shown as squares in FIG. 2. A parent node is linked via branches to one or more child nodes (e.g., any positive number of child nodes), and vice versa, so that: (a) such parent node is referenced herein as a "parent" of such child nodes; (b) such child nodes are referenced herein as "children" of such parent; (c) such children are referenced herein as "siblings" of one another; and (d) a child node, its children, and its children's children, etc. are referenced herein as "descendants" of such child node's parent, so that such descendants descend (directly and indirectly) from such parent. Accordingly, a child node may itself be a parent of other child nodes. If a node has no children, then such node is a leaf node.

When the computer 104 creates the decision tree 200, the computer 104 dynamically allocates locations within the system external memory 106 for storing the nodes. After the computer 104 stores the nodes at such allocated locations within the system external memory 106, the computer 104 creates the links between a parent and its children in response to the training examples, according to the machine learning rules. In the illustrative embodiment, a link from a first node to a second node is a pointer (stored in association with the first node at its allocated location within the system external memory 106), which encodes a physical address of the second node's allocated location within the system external memory 106, so that the linked first and second nodes may be physically distant from one another within the system external memory 106. Accordingly, the nodes may be stored at scattered locations throughout the system external memory 106.

In the example of FIG. 2: (a) a node 202 is a parent of two children, which are a node 204 and a leaf node 206; and (b) the node 204 is a parent of two children, which are leaf nodes 208 and 210. Accordingly, the nodes 204 and 206 are siblings of one another. Likewise, the nodes 208 and 210 are siblings of one another.

A root node 212 has no parent, but any other node of the decision tree 200 has exactly one parent. In the illustrative embodiment, a parent's attributes are inherited by all of such parent's children. The root node 212 is related (directly and indirectly) to the remaining nodes as shown in FIG. 2. Accordingly, all of the remaining nodes are descendants of the root node 212, so they descend (directly and indirectly) from the root node 212.

Each node has a respective depth level within the decision tree 200. Such node's respective depth level is a total number of nodes (including such node and the root node 212) that would be traversed in parsing from the root node 212 to such node. Accordingly, the root node 212 has a respective depth level=1. By comparison, the node 208 has a respective depth level=7.

The decision tree 200 is a model for predicting a value of a target variable in response to a query (e.g., a query that has one or more conditions). To determine whether a node satisfies conditions of such query, the DSP 102 reads (e.g., for evaluation or parsing) such node and compares such node's attributes to such conditions. Accordingly, in response to such query, the DSP 102 reads various nodes of the decision tree 200 (from the system external memory 106) in a top-down manner, starting at the root node 212 and continuing along a path through one or more other nodes whose attributes satisfy conditions of such query. For example, FIG. 2 shows: (a) a first path A, which includes a first set of nodes whose attributes satisfy a first set of conditions; and (b) a second path B, which includes a second set of nodes whose attributes satisfy a second set of conditions.

The decision tree's size can exceed storage capacity of either the L1/L2 data cache or the DMA on-chip memory 116. In one example, a decision tree has more than 250,000 nodes and 20 depth levels, which are stored in more than 10 megabytes of the system external memory 106. Accordingly, in a first embodiment, the CPU 112 reads the decision tree by: (a) in response to a miss in the L1/L2 data cache, outputting signals that command the bus interface unit 118 to copy (e.g., fetch) a subset of the decision tree's nodes from the system external memory 106 for temporary storage into the L1/L2 data cache; (b) evaluating one or more of such nodes that are temporarily stored within the L1/L2 data cache; and (c) if necessary, suitably repeating such copying (from the system external memory 106 into the L1/L2 data cache) and evaluation (within the L1/L2 data cache) of one or more additional subsets of the decision tree's nodes, which replace nodes that were previously stored within the L1/L2 data cache.

In a second embodiment, the CPU 112 reads the decision tree by: (a) in response to instructions of a computer program for DMA management, outputting signals that command the DMA engine 120 to copy (e.g., prefetch) a subset of the decision tree's nodes from the system external memory 106 for temporary storage into the DMA on-chip memory 116; (b) evaluating one or more of such nodes that are temporarily stored within the DMA on-chip memory 116; and (c) if necessary, suitably repeating such copying (from the system external memory 106 into the DMA on-chip memory 116) and evaluation (within the DMA on-chip memory 116) of one or more additional subsets of the decision tree's nodes, which replace nodes that were previously stored within the DMA on-chip memory 116. In the first and second embodiments, when a decision tree is evaluated by the DSP 102, the decision tree's nodes and other information remain unmodified by the DSP 102. Accordingly, coherency of such nodes and other information is maintained, even without copying back (e.g., from either the L1/L2 data cache or the DMA on-chip memory 116) to the system external memory 106.

As the decision tree's size increases, the CPU 112 is more likely to repeat (e.g., several times) such copying and evaluation of additional subsets of the decision tree's nodes, before the CPU 112 finishes such reading of the decision tree. If such evaluation is delayed by waiting for such copying, then such reading's efficiency (e.g., speed) is diminished. By comparison, if such copying is repeated fewer times, or if such evaluation continues in parallel with such copying, then such reading's efficiency is enhanced.

For example, if more of the first set of nodes (along the first path A of FIG. 2) are stored in physically contiguous locations (e.g., in the same line, or at least in the same page) within the system external memory 106, then the DSP 102 is able to more efficiently: (a) copy the first set of nodes (into either the L1/L2 data cache or the DMA on-chip memory 116) from the system external memory 106; and (b) evaluate the decision tree 200 in response to a query that has the first set of conditions (which are satisfied by attributes of the first set of nodes). Similarly, if more of the second set of nodes (along the second path B of FIG. 2) are stored in physically contiguous locations within the system external memory 106, then the DSP 102 is able to more efficiently: (a) copy the second set of nodes (into either the L1/L2 data cache or the DMA on-chip memory 116) from the system external memory 106; and (b) evaluate the decision tree 200 in response to a query that has the second set of conditions (which are satisfied by attributes of the second set of nodes).

FIG. 3 is a flowchart of a first operation of the system 100, in which the computer 104 reorders (e.g., sequences) various nodes to be stored in physically contiguous locations (e.g., in the same line, or at least in the same page) within the system external memory 106, while updating links between nodes to preserve their parent-child relationships. In the course of reordering (e.g., sequencing) such nodes, the computer 104 groups such nodes into a set of nodes ("packed node"), as discussed hereinbelow in connection with FIGS. 3-13. After such reordering, the DSP 102 is able to more efficiently copy such nodes (into either the L1/L2 data cache or the DMA on-chip memory 116) from the system external memory 106, because a single fetch (e.g., of a line or page) from the system external memory 106 is more likely to include multiple ones of such nodes (e.g., so that the CPU 112 encounters a smaller number of misses in the L1/L2 data cache). By more efficiently copying such nodes, the DSP 102 is able to more efficiently evaluate the decision tree in response to a query whose conditions are satisfied by attributes of such nodes.

Figure 4:
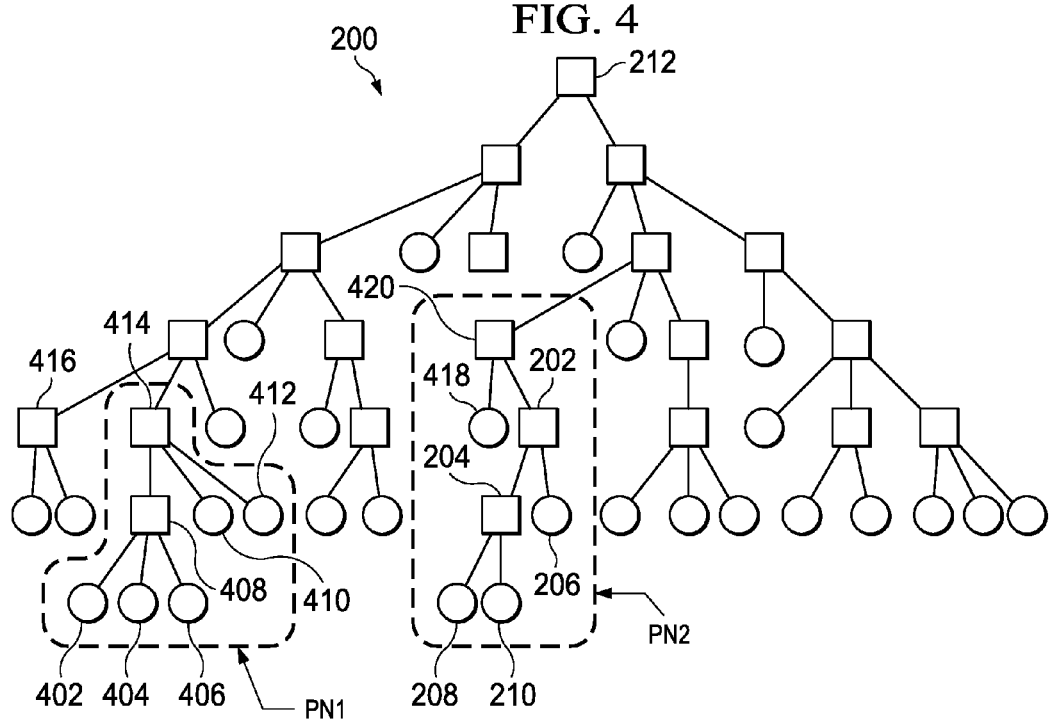
FIG. 4 is a diagram of first and second packed nodes of the first decision tree in the first operation.

FIG. 4 is a diagram of first and second packed nodes PN1 and PN2 of the decision tree 200 in the first operation. Referring to FIGS. 3 and 4, the first operation begins at a step 302, at which the computer 104: (a) computes each node's respective depth level within the decision tree 200; and (b) stores an array that identifies all nodes in a descending order of their respective depth levels ("depth array"). Initially, all nodes are untagged within the depth array. In the example of FIG. 4, each of the leaf nodes 208, 210, 402, 404 and 406 has a respective depth level=7, which is the deepest level within the decision tree 200, so those nodes are identified at the beginning of the depth array.

After the step 302, the first operation continues to a step 304, at which the computer 104 instantiates a new empty packed node (e.g., PN1 in the example of FIG. 4). At a next step 306, the computer 104 identifies a deepest untagged leaf node within the depth array, so that such deepest untagged leaf node is a current node. In the example of FIG. 4, the computer 104 identifies the leaf node 402 as the first current node, but alternatively the computer 104 could have identified any of the leaf nodes 208, 210, 402, 404 and 406 as the first current node (because each of those nodes is located at the deepest level within the decision tree 200).

At a next step 308, the computer 104: (a) adds the current node to the packed node (which was most recently instantiated at the step 304), so that the packed node's population increases; and (b) within the depth array, tags the current node to indicate that it has been added to a packed node. At a next step 310, the computer 104 determines whether any sibling of the current node is neither a leaf nor a packed node. If each sibling of the current node is either a leaf or a packed node, then the first operation continues from the step 310 to a step 312.

At the step 312, the computer 104 determines whether the packed node's size has exceeded a maximum size (e.g., a particular number of physically contiguous locations within the system external memory 106). In the illustrative embodiment, the maximum size is within (e.g., slightly less than) a storage capacity of either the L1/L2 data cache or the DMA on-chip memory 116, so that either: (a) storage capacity of L1/L2 data cache=maximum size+one node's size; or (b) storage capacity of DMA on-chip memory=maximum size+ one node's size. If the packed node's size has not exceeded the maximum size, then the first operation continues from the step 312 to a step 314.

At the step 314, the computer 104 determines whether any untagged sibling of the current node is a leaf. If an untagged sibling of the current node is a leaf, then the first operation continues from the step 314 to a step 316. At the step 316, the computer 104: (a) adds such untagged sibling to the packed node (which was most recently instantiated at the step 304), so that the packed node's population increases; and (b) within the depth array, tags such untagged sibling to indicate that it has been added to a packed node. After the step 316, the first operation returns to the step 312.

In the example of FIG. 4, the computer 104 repeats the steps 312, 314 and 316 until the nodes 402, 404 and 406 have been: (a) added to the packed node (which was most recently instantiated at the step 304); and (b) within the depth array, tagged to indicate that they have been added to a packed node. After the nodes 402, 404 and 406 have been so added and tagged: (a) the computer 104 determines (at the step 314) that no untagged sibling of the current node 402 is a leaf; and (b) in response thereto, the first operation continues from the step 314 to a step 318.

At the step 318, the computer 104 determines whether any untagged sibling of the current node is a packed node. In the example of FIG. 4, after the nodes 402, 404 and 406 have been so added and tagged: (a) the computer 104 determines (at the step 318) that no untagged sibling of the current node 402 is a packed node; and (b) in response thereto, the first operation continues from the step 318 to a step 320. At the step 320, the computer 104 identifies the current node's parent as the next current node, and the first operation returns to the step 308.

Accordingly, in the example of FIG. 4, after the nodes 402, 404 and 406 have been so added and tagged, the computer 104 identifies (at the step 320) the node 408 as the next current node, and the first operation returns to repeat the steps 308, 310, 312, 314 and 316 until the nodes 408, 410 and 412 have been: (a) added to the packed node (which was most recently instantiated at the step 304); and (b) within the depth array, tagged to indicate that they have been added to a packed node. After the nodes 408, 410 and 412 have been so added and tagged, the computer 104: (a) determines (at the step 314) that no untagged sibling of the current node 408 is a leaf; (b) determines (at the step 318) that no untagged sibling of the current node 408 is a packed node; and (c) identifies (at the step 320) the node 414 as the next current node.

After the computer 104 identifies the node 414 as the next current node, the first operation returns to repeat the steps 308 and 310. At the step 310: (a) the computer 104 determines that the node 416 (which is a sibling of the current node 414) is neither a leaf nor a packed node; and (b) in response thereto, the first operation continues from the step 310 to a step 322. At the step 322, the computer 104: (a) inserts the packed node (which was most recently instantiated at the step 304) into the decision tree, in the same location as the most recent current node; and (b) within the packed node, reorders nodes according to their respective depth levels, as discussed further hereinbelow in connection with FIGS. 9-13. In that manner, the computer 104 instantiates, populates, inserts and reorders the packed node PN1.

Similarly, after the step 322, the first operation returns to the step 304, at which the computer 104 instantiates a new empty packed node (e.g., PN2 in the example of FIG. 4). Accordingly, in the example of FIG. 4, the computer 104 repeats the steps 304 through 322 to instantiate, populate, insert and reorder the packed node PN2, which includes the nodes 202, 204, 206, 208, 210, 418 and 420. Referring again to the step 312, if the packed node's size has exceeded the maximum size, then the first operation continues from the step 312 to a step 324. At the step 324, the computer 104 marks the packed node as being full, and the first operation continues to the step 322.

Figure 5:
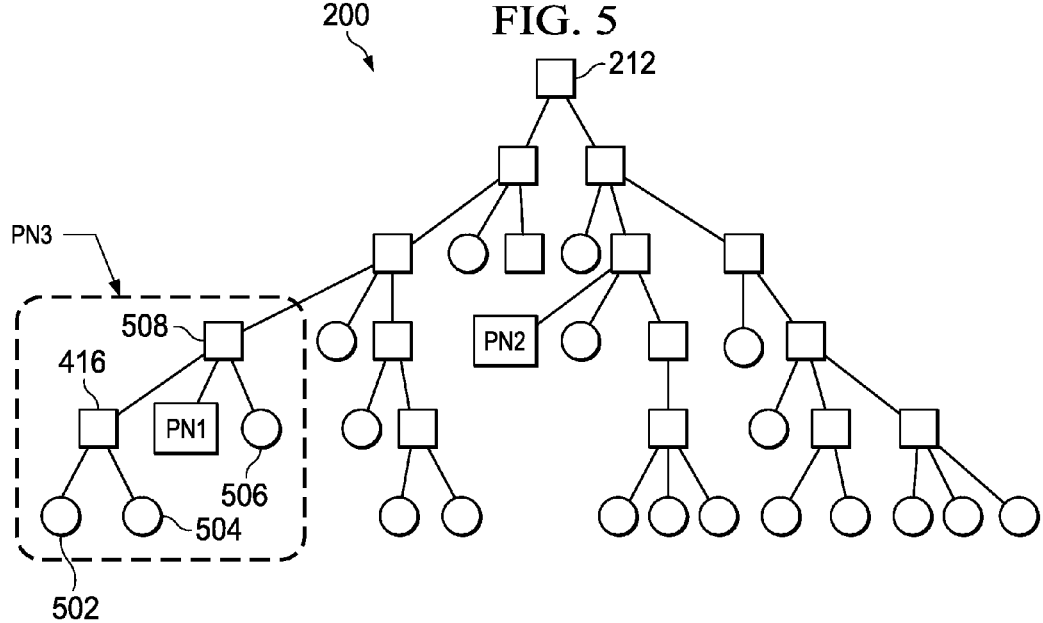
FIG. 5 is a diagram of a third packed node of the first decision tree in the first operation.

FIG. 5 is a diagram of a third packed node PN3 of the decision tree 200 in the first operation. In the example of FIG. 5, the computer 104 repeats the steps 304 through 320 until the nodes 502, 504, 416 and 506 (in that order) have been: (a) added to the packed node PN3; and (b) within the depth array, tagged to indicate that they have been added to a packed node. After the nodes 502, 504, 416 and 506 (in that order) have been so added and tagged: (a) the computer 104 determines (at the step 318) that an untagged sibling of the current node 416 is a packed node; and (b) in response thereto, the first operation continues from the step 318 to a step 326.

At the step 326, the computer 104 determines whether addition of such untagged sibling (which is the packed node PN1 in the example of FIG. 5) to the third packed node PN3 would cause the third packed node PN3 to exceed the maximum size (which is discussed hereinabove in connection with the step 312 of FIG. 3). If addition of such untagged sibling to the packed node (which is the third packed node PN3 in the example of FIG. 5) would cause the packed node to exceed the maximum size, then the first operation continues from the step 326 to the step 320. Conversely (e.g., as in the example of FIG. 5), if addition of such untagged sibling to the packed node would not cause the packed node to exceed the maximum size, then the first operation continues from the step 326 to a step 328.

At the step 328, the computer 104: (a) adds such untagged sibling to the packed node, so that the packed node's population increases; and (b) tags such untagged sibling to indicate that it has been added to another packed node. After the step 328, the first operation returns to the step 318.

Figure 6:
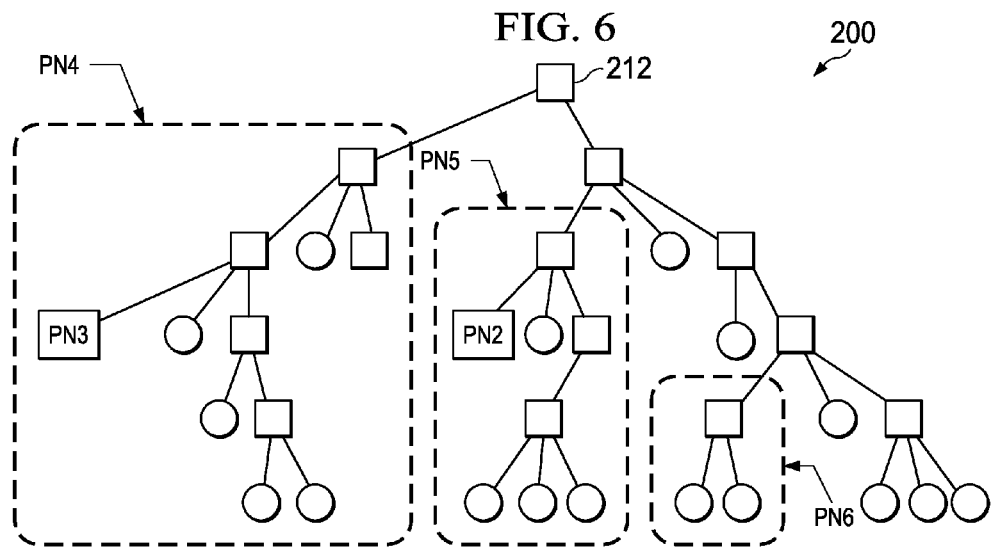
FIG. 6 is a diagram of fourth, fifth and sixth packed nodes of the first decision tree in the first operation.

FIG. 6 is a diagram of fourth, fifth and sixth packed nodes PN4, PN5 and PN6 of the decision tree 200 in the first operation. Accordingly, the computer 104 instantiates, populates, inserts and reorders the packed nodes PN4, PN5 and PN6, in that order, according to the steps of FIG. 3. As shown in FIG. 6, the packed node PN4 includes the packed node PN3, because the computer 104 determined (at the step 326) that addition (to the packed node PN4) of the packed node PN3 would not cause the packed node PN4 to exceed the maximum size (which is discussed hereinabove in connection with the step 312 of FIG. 3) in such example. Similarly, as shown in FIG. 6, the packed node PN5 includes the packed node PN2, because the computer 104 determined (at the step 326) that addition (to the packed node PN5) of the packed node PN2 would not cause the packed node PN5 to exceed the maximum size in such example.

Figure 7:
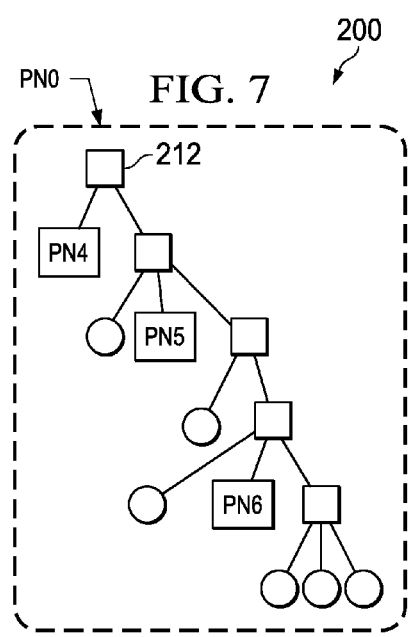
FIG. 7 is a diagram of a first example of a seventh packed node of the first decision tree in the first operation.

FIG. 7 is a diagram of a first example of a seventh packed node PN0 of the decision tree 200 in the first operation. As shown in the first example of FIG. 7, the packed node PN0 includes the packed nodes PN4, PN5 and PN6, because the computer 104 determined (at the step 326) that addition (to the packed node PN0) of the packed nodes PN4, PN5 and PN6 would not cause the packed node PN0 to exceed the maximum size in such example. In the example of FIG. 7, all nodes have been tagged within the depth array, and the first operation (FIG. 3) ends in response thereto.

Figure 8:
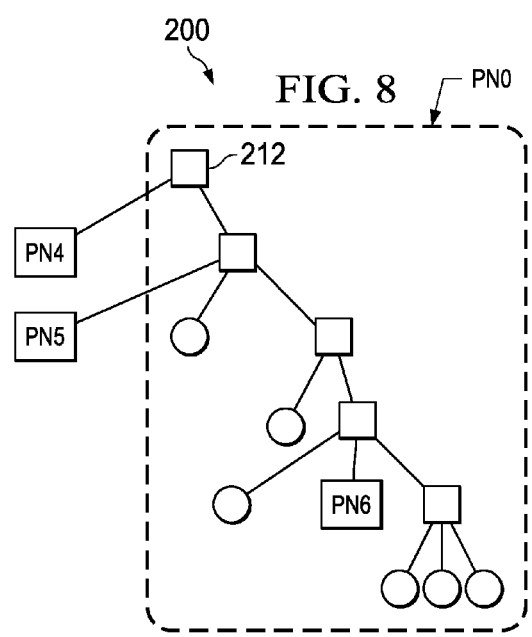
FIG. 8 is a diagram of a second example of the seventh packed node of the first decision tree in the first operation.

FIG. 8 is a diagram of a second example of the seventh packed node PN0 of the decision tree 200 in the first operation. As shown in the second example of FIG. 8, the packed node PN0: (a) includes the packed node PN6, because the computer 104 determined (at the step 326) that addition (to the packed node PN0) of the packed node PN6 would not cause the packed node PN0 to exceed the maximum size in such example; and (b) excludes the packed nodes PN4 and PN5, because the computer 104 determined (at the step 326) that addition (to the packed node PN0) of either the packed node PN4 or the packed node PN5 would cause the packed node PN0 to exceed the maximum size in such example.

Figure 9:
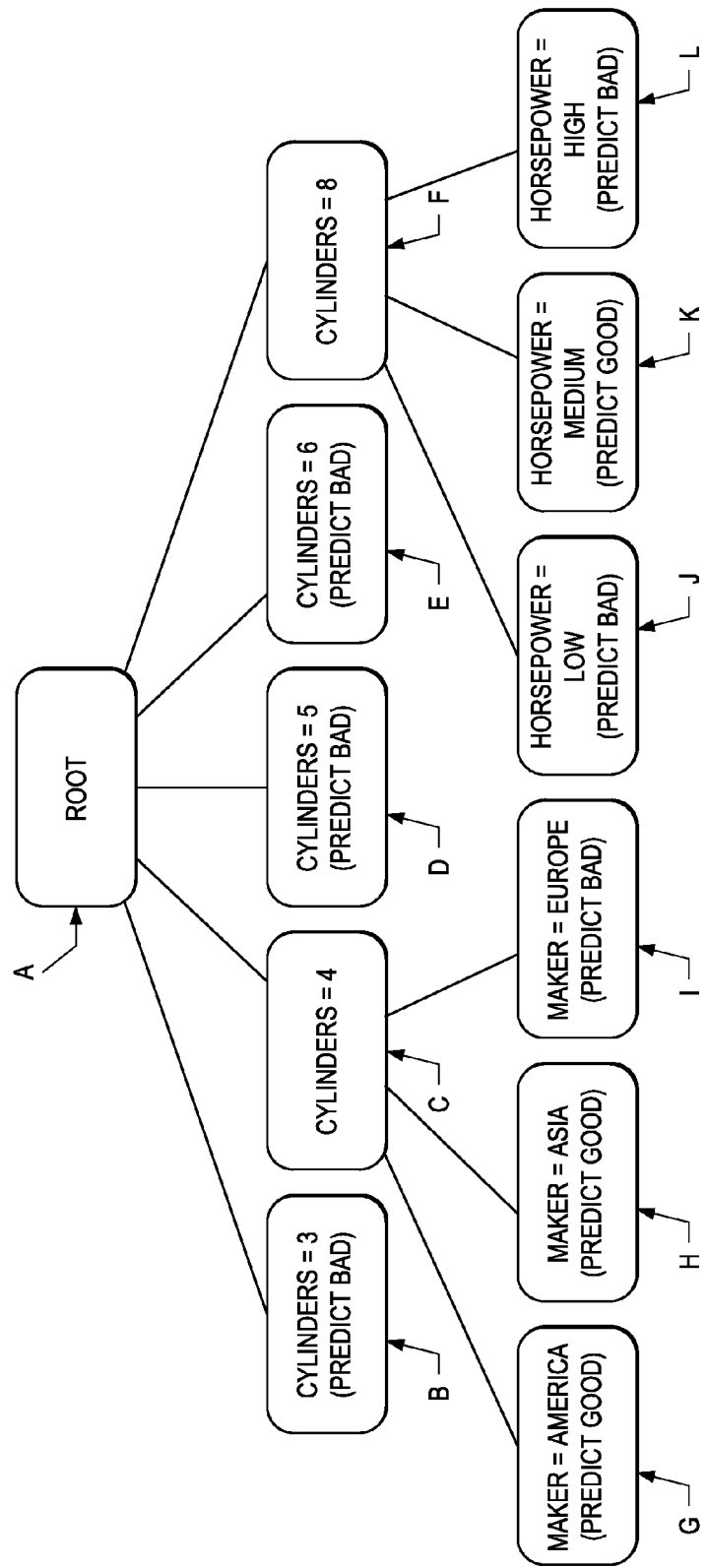
FIG. 9 is a diagram of a second decision tree, which is processable by the system of FIG. 1.

FIG. 9 is a diagram of a decision tree, which is processable by the system 100. Such decision tree has twelve (12) nodes, which are labeled in FIG. 9 as nodes A through L. Node A is a root node, which is related (directly and indirectly) to the remaining nodes as shown in FIG. 9. Accordingly, all of the remaining nodes are descendants of the root node A, so they descend (directly and indirectly) from the root node A. The nodes B, D, E, G, H, I, J, K and L are leaf nodes.

Such decision tree is useful for predicting whether a car's mileage is "good" or "bad," in response to the car's number of cylinders, maker, and horsepower. For example, according to such decision tree, if the car's engine has four cylinders (node C), and if the car's maker is located in Asia (node H), then the car's mileage is predicted to be "good." Or, if the car's engine has eight cylinders (node F), and if the car's horsepower is high (node L), then the car's mileage is predicted to be "bad."

Figures 10, 11:
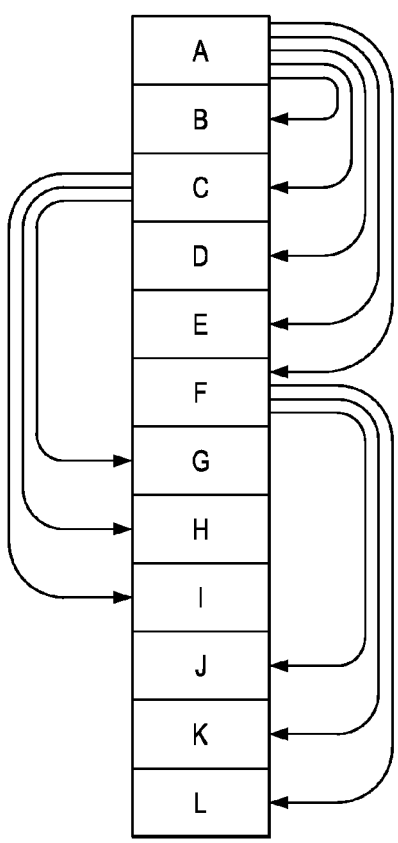
FIG. 10 is a diagram of a linked list of memory locations for storing information of the second decision tree.
FIG. 11 is a diagram of a depth array of the first operation of FIG. 3, corresponding to the decision tree of FIG. 9.

FIG. 10 is a diagram of a linked list of memory locations for storing information of the decision tree of FIG. 9, within the system external memory 106. As shown in FIG. 10, the node A is linked to its children nodes B, C, D, E and F. Also, the node C is linked to its children nodes G, H and I, but such children nodes are stored in memory locations that are not physically contiguous with the node C's memory location. Similarly, the node F is linked to its children nodes J, K and L, but such children nodes are stored in memory locations that are not physically contiguous with the node F's memory location.

FIG. 11 is a diagram of a depth array of the first operation of FIG. 3, corresponding to the decision tree of FIG. 9. The depth array is stored by the computer 104 in performing the first operation of FIG. 3. As shown in the example of FIG. 11, the depth array identifies the nodes A through L in a descending order of their respective depth levels. Such depth levels are stored within the depth array. Initially, all nodes are untagged within the depth array, but FIG. 11 shows the depth array for a particular stage of the first operation in which: (a) the nodes C, G, H and I are tagged (as denoted by "X" in the "Tag" column); and (b) the nodes A, B, D, E, F, J, K and L are untagged (as denoted by a blank in the "Tag" column).

FIG. 12 is a diagram of a first packed node PN1 of the decision tree of FIG. 9, before and after the step 322 of FIG. 3. In accordance with FIG. 3, the computer 104 adds nodes to the packed node PN1 in an order of G, H, I and C, as shown in FIG. 12. At the step 322, within the packed node PN1, the computer 104 reorders such nodes according to their respective depth levels (as identified within the depth array of FIG. 11). Accordingly, after the step 322, the reordered packed node $PN1_R$ includes such nodes in an order of C, G, H and I, as shown in FIG. 12.

FIG. 13 is a diagram of a second packed node PN2 of the decision tree of FIG. 9, before and after the step 322 of FIG. 3. In accordance with FIG. 3, the computer 104 adds nodes to the packed node PN2 in an order of J, K, L, F, B, D, E, $PN1_R$ and A, as shown in FIG. 12. At the step 322, within the packed node PN2, the computer 104 reorders such nodes according to their respective depth levels (as identified within the depth array of FIG. 11). Accordingly, after the step 322, the reordered packed node $PN2_R$ includes such nodes in an order of A, B, D, E, $PN1_R$, F, J, K and L, as shown in FIG. 12. After the packed node PN2 has been instantiated, populated, inserted and reordered (as the reordered packed node $PN2_R$) in accordance with FIG. 3, all nodes will have been tagged within the depth array of FIG. 11, and the first operation (FIG. 3) ends in response thereto.

FIG. 14 is a diagram of the linked list of memory locations of the decision tree of FIG. 9, within the system external memory 106, after the first operation of FIG. 3. As shown in FIG. 14, the system external memory 106 stores the decision tree of FIG. 9 in an order of A, B, D, E, C, G, H, I, F, J, K and L. This order is the same as the reordered packed node $PN2_R$ (FIG. 13), but with $PN1_R$'s actual nodes C, G, H and I being shown within a dashed enclosure.

As shown in FIG. 14, the node A is still linked to its children nodes B, C, D, E and F. Also, the node C is still linked to its children nodes G, H and I, but such children nodes are stored in memory locations that are physically contiguous with the node C's memory location, so that the DSP 102 is able to more efficiently: (a) copy the set of nodes C, G, H and I (into either the L1/L2 data cache or the DMA on-chip memory 116) from the system external memory 106; and (b) evaluate the decision tree of FIG. 9 in response to a query that has a set of conditions that are satisfied by attributes of such physically contiguous nodes. Similarly, the node F is still linked to its children nodes J, K and L, but such children nodes are stored in memory locations that are physically contiguous with the node F's memory location, so that the DSP 102 is able to more efficiently: (a) copy the set of nodes F, J, K and L (into either the L1/L2 data cache or the DMA on-chip memory 116) from the system external memory 106; and (b) evaluate the decision tree of FIG. 9 in response to a query that has a set of conditions that are satisfied by attributes of such physically contiguous nodes.

In the illustrative embodiment, a packed node has its own respective set of local addresses. With such local addresses, various nodes (within the packed node) are more easily linked by pointers that consume less memory space. For example, the packed node $PN1_R$ (FIG. 12) has a first set of local addresses for linking the node C through pointers to its children nodes G, H and I. Also, the packed node $PN2_R$ (FIG. 13) has a second set of local addresses for linking various nodes within the packed node $PN2_R$ (e.g., for linking the node F through pointers to its children nodes J, K and L). Similarly, the linked list of memory locations (FIG. 10 and FIG. 14) has its own respective set of local addresses.

Figure 15:
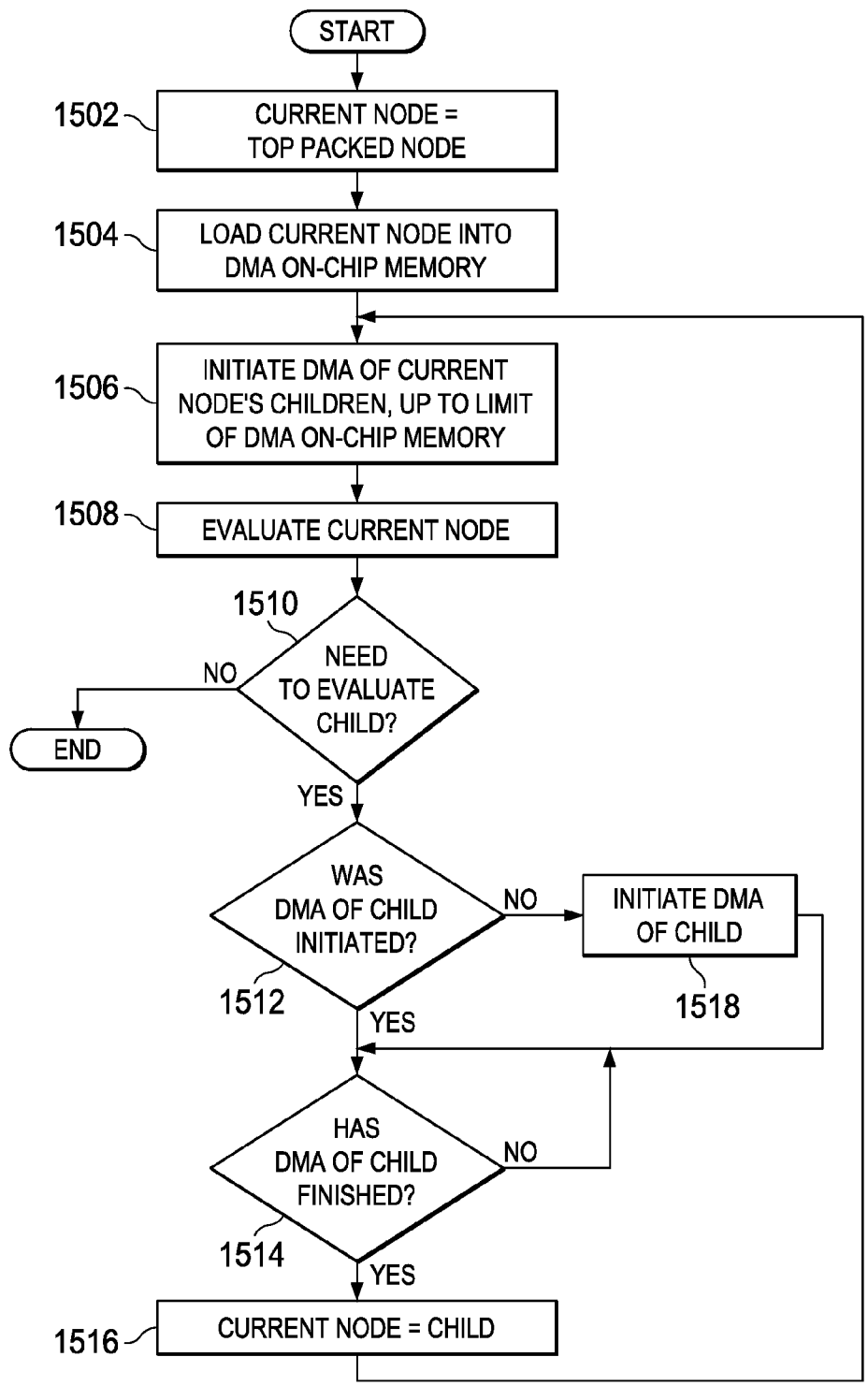
FIG. 15 is a flowchart of a second operation of the system of FIG. 1.

FIG. 15 is a flowchart of a second operation of the system 100, in which the DSP 102 predicts a value of a target variable in response to a query (e.g., a query that has one or more conditions). In response to such query, the DSP 102 reads (e.g., for evaluation or parsing) various nodes of the decision tree (from the system external memory 106) in a top-down manner, starting at the decision tree's root node and continuing along a path through one or more other nodes whose attributes satisfy conditions of such query. In the example of FIG. 15, various nodes of the decision tree have been reordered to be stored in physically contiguous locations within the system external memory 106, as discussed hereinabove in connection with FIGS. 2-14.

Accordingly, the second operation begins at a step 1502, at which the DSP 102 identifies a top packed node (which includes the decision tree's root node) within the decision tree, so that such top packed node is a current node. At a next step 1504, the DSP 102 loads (e.g., fetches) the current node into the DMA on-chip memory 116. For such loading, the DSP 102 outputs signals that command the DMA engine 120 to copy the current node from the system external memory 106 for temporary storage into the DMA on-chip memory 116.

At a next step 1506, the DSP 102 initiates loading (e.g., prefetching) of the current node's children into the DMA on-chip memory 116, up to a limit of then-currently available space within the DMA on-chip memory 116. At a next step 1508, the DSP 102 evaluates the current node. At a next step 1510, in response to such evaluation, the DSP 102 determines whether its prediction (in response to such query) is subject to evaluation by the DSP 102 of one of the current node's children.

If the DSP 102 determines (at the step 1510) that its prediction (in response to such query) is not subject to evaluation by the DSP 102 of any of the current node's children, then the second operation ends. Conversely, if the DSP 102 determines (at the step 1510) that its prediction (in response to such query) is subject to evaluation by the DSP 102 of a particular one of the current node's children ("necessary child"), then the second operation continues from the step 1510 to a step 1512. At the step 1512, the DSP 102 determines whether it has already initiated loading (at the earlier step 1506) of such necessary child (which may be a packed node) into the DMA on-chip memory 116.

If the DSP 102 has already initiated loading of such necessary child into the DMA on-chip memory 116, then the second operation continues from the step 1512 to a step 1514. At the step 1514, the second operation self-loops until such loading is finished. After such loading is finished, the second operation continues from the step 1514 to a next step 1516, at which the DSP 102 identifies such necessary child as being the next current node, and the second operation returns to the step 1506.

Referring again to the step 1512, if the DSP 102 has not already initiated loading of such necessary child into the DMA on-chip memory 116 (e.g., due to the limit of then-currently available space within the DMA on-chip memory 116 at the earlier step 1506), then the second operation continues from the step 1512 to a step 1518. At the step 1518, the DSP 102 initiates loading of such necessary child into the DMA on-chip memory 116. After the step 1518, the second operation continues to the step 1514.

Figure 16:
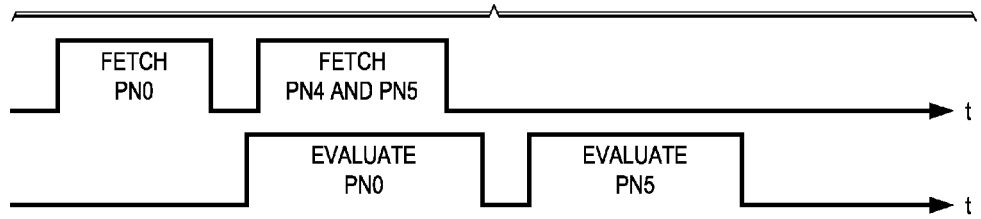
FIG. 16 is a first example timing diagram of the second operation of FIG. 15, with reference to the decision tree of FIG. 8.

FIG. 16 is a first example timing diagram of the second operation of FIG. 15, with reference to the decision tree 200 of FIG. 8. In the first example of FIG. 16, the DSP 102: (a) identifies the top packed node PN0 (which includes the root node 212) within the decision tree 200 as being the current node (step 1502 of FIG. 15); and (b) loads (e.g., fetches) the current node PN0 into the DMA on-chip memory 116 (step 1504 of FIG. 15). After the DSP 102 finishes loading the current node PN0 into the DMA on-chip memory 116, the DSP 102: (a) initiates loading (e.g., prefetching) of the current node PN0's children (which are the packed nodes PN4 and PN5) into the DMA on-chip memory 116, up to the limit of then-currently available space within the DMA on-chip memory 116 (step 1506 of FIG. 15); and (b) concurrently with such loading, evaluates the current node PN0 (step 1508 of FIG. 15). In the example of FIG. 16, the limit of then-currently available space within the DMA on-chip memory 116 is sufficient for storing all of the packed nodes PN4 and PN5.

In response to such evaluation of the current node PN0, the DSP 102 determines that its prediction is subject to its evaluation of the packed node PN5 (step 1510 of FIG. 15). Accordingly, in response to such determination, the DSP 102 evaluates the packed node PN5 without waiting for additional loading of the packed node PN5 into the DMA on-chip memory 116. Advantageously, such waiting is avoided, because the DSP 102 already loaded the packed node PN5 into the DMA on-chip memory 116 (at step 1506 of FIG. 15) concurrently with such evaluation of the packed node PN0.

Figure 17:
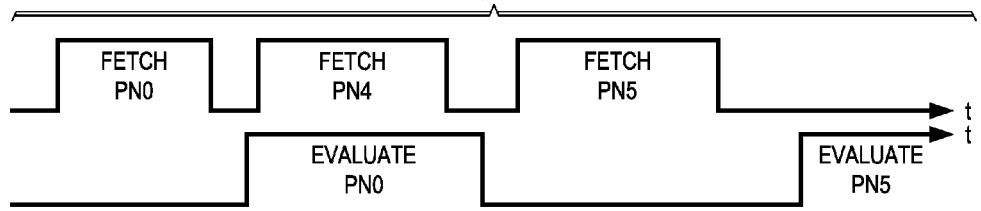
FIG. 17 is a second example timing diagram of the second operation of FIG. 15, with reference to the decision tree of FIG. 8.

FIG. 17 is a second example timing diagram of the second operation of FIG. 15, with reference to the decision tree 200 of FIG. 8. In the second example of FIG. 17, the DSP 102: (a) identifies the top packed node PN0 (which includes the root node 212) within the decision tree 200 as being the current node (step 1502 of FIG. 15); and (b) loads (e.g., fetches) the current node PN0 into the DMA on-chip memory 116 (step 1504 of FIG. 15). After the DSP 102 finishes loading the current node PN0 into the DMA on-chip memory 116, the DSP 102: (a) initiates loading (e.g., prefetching) of the current node PN0's children (which are the packed nodes PN4 and PN5) into the DMA on-chip memory 116, up to the limit of then-currently available space within the DMA on-chip memory 116 (step 1506 of FIG. 15); and (b) concurrently with such loading, evaluates the current node PN0 (step 1508 of FIG. 15). However, in the example of FIG. 17: (a) the limit of then-currently available space within the DMA on-chip memory 116 is insufficient for storing all of the packed nodes PN4 and PN5; and (b) accordingly, only the packed node PN4 is prefetched into the DMA on-chip memory 116 at the step 1506.

In response to such evaluation of the current node PN0, the DSP 102 determines that its prediction is subject to its evaluation of the packed node PN5 (step 1510 of FIG. 15). Accordingly, in response to such determination, the DSP 102: (a) additionally loads (e.g., fetches) the packed node PN5 into the DMA on-chip memory 116 (steps 1518 and 1514 of FIG. 15); and (b) evaluates the packed node PN5 after waiting for such additional loading to finish. Such waiting occurs, because the DSP 102 was unable to load the packed node PN5 into the DMA on-chip memory 116 (at step 1506 of FIG. 15) concurrently with such evaluation of the packed node PN0, due to the limit of then-currently available space within the DMA on-chip memory 116.

By comparison, if the DSP 102 determines (in response to such evaluation of the current node PN0) that its prediction is subject to its evaluation of the packed node PN4 (step 1510 of FIG. 15), then the DSP 102 evaluates the packed node PN4 without waiting for additional loading of the packed node PN4 into the DMA on-chip memory 116. Advantageously, such waiting is avoided, because the DSP 102 already loaded the packed node PN4 into the DMA on-chip memory 116 (at step 1506 of FIG. 15) concurrently with such evaluation of the packed node PN0. In view of these examples, the first and second operations of FIGS. 3 and 15 are suitable for a wide range of systems (e.g., embedded systems, such as portable electronic devices), especially for systems in which a decision tree's size can exceed storage capacity of either the L1/L2 data cache or the DMA on-chip memory 116.

In the illustrative embodiment, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., Java, Smalltalk, and C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Although illustrative embodiments have been shown and described by way of example, a wide range of alternative embodiments is possible within the scope of the foregoing disclosure.

What is claimed is:

1. A method performed by a combination of electronic circuitry components for storing a decision tree, the method comprising:
    storing at least first nodes and second nodes of the decision tree within a memory, wherein the first nodes include a first parent node and first remaining nodes that descend from the first parent node, and wherein the second nodes include a second parent node and second remaining nodes that descend from the second parent node;
    grouping the first nodes into a first packed node stored in first physically contiguous locations of the memory, wherein the first nodes are sequenced in the first physically contiguous locations according to respective depth levels of the first nodes within the decision tree; and
    grouping the second nodes into a second packed node stored in second physically contiguous locations of the memory, wherein the second nodes are sequenced in the second physically contiguous locations according to respective depth levels of the second nodes within the decision tree;
    wherein the first packed node has a first set of local addresses for linking the first parent node through first pointers to the first remaining nodes, and wherein the second packed node has a second set of local addresses for linking the second parent node through second pointers to the second remaining nodes.

2. The method of claim 1, wherein the first nodes descend from the second parent node, and wherein the method includes: inserting the first packed node into the decision tree as one of the second remaining nodes, so that the second packed node includes the first packed node.

3. The method of claim 2, wherein the second physically contiguous locations include the first physically contiguous locations, in which the first nodes remain sequenced according to respective depth levels of the first nodes within the decision tree.

4. The method of claim 1, wherein grouping the second nodes includes: grouping the second nodes into the second packed node stored in the second physically contiguous locations, but only up to a particular number of the second physically contiguous locations.

5. The method of claim 4, wherein the memory is a system memory, and wherein the particular number is within a storage capacity of a cache memory of a processor device.

6. The method of claim 4, wherein the memory is a system memory, and wherein the particular number is within a storage capacity of a direct memory access ("DMA") memory of a processor device.

7. The method of claim 1, wherein the first nodes are sequenced in the first physically contiguous locations in a descending order of respective depth levels of the first nodes within the decision tree.

8. The method of claim 1, wherein the second physically contiguous locations are located within a same page of the memory.

9. The method of claim 1, wherein the first physically contiguous locations are located within a same line of the memory.

10. A system for storing a decision tree, the system comprising:
    a combination of electronic circuitry components for: storing at least first nodes and second nodes of the decision tree within a memory, wherein the first nodes include a first parent node and first remaining nodes that descend from the first parent node, and wherein the second nodes include a second parent node and second remaining nodes that descend from the second parent node; grouping the first nodes into a first packed node stored in first physically contiguous locations of the memory, wherein the first nodes are sequenced in the first physically contiguous locations according to respective depth levels of the first nodes within the decision tree; and grouping the second nodes into a second packed node stored in second physically contiguous locations of the memory, wherein the second nodes are sequenced in the second physically contiguous locations according to respective depth levels of the second nodes within the decision tree;
    wherein the first packed node has a first set of local addresses for linking the first parent node through first pointers to the first remaining nodes, and wherein the second packed node has a second set of local addresses for linking the second parent node through second pointers to the second remaining nodes.

11. The system of claim 10, wherein the first nodes descend from the second parent node, and wherein the combination of electronic circuitry components are for: inserting the first packed node into the decision tree as one of the second remaining nodes, so that the second packed node includes the first packed node.

12. The system of claim 11, wherein the second physically contiguous locations include the first physically contiguous locations, in which the first nodes remain sequenced according to respective depth levels of the first nodes within the decision tree.

13. The system of claim 10, wherein grouping the second nodes includes: grouping the second nodes into the second packed node stored in the second physically contiguous locations, but only up to a particular number of the second physically contiguous locations.

14. The system of claim 13, wherein the memory is a system memory, and wherein the particular number is within a storage capacity of a cache memory of a processor device.

15. The system of claim 13, wherein the memory is a system memory, and wherein the particular number is within a storage capacity of a direct memory access ("DMA") memory of a processor device.

16. The system of claim 10, wherein the first nodes are sequenced in the first physically contiguous locations in a descending order of respective depth levels of the first nodes within the decision tree.

17. The system of claim 10, wherein the second physically contiguous locations are located within a same page of the memory.

18. The system of claim 10, wherein the first physically contiguous locations are located within a same line of the memory.

19. A non-transitory computer-readable medium storing instructions that are processable by an instruction execution apparatus for causing the apparatus to perform a method comprising: storing at least first nodes and second nodes of the decision tree within a memory, wherein the first nodes include a first parent node and first remaining nodes that descend from the first parent node, and wherein the second nodes include a second parent node and second remaining nodes that descend from the second parent node; grouping the first nodes into a first packed node stored in first physically contiguous locations of the memory, wherein the first nodes are sequenced in the first physically contiguous locations according to respective depth levels of the first nodes within the decision tree; and grouping the second nodes into a second packed node stored in second physically contiguous locations of the memory, wherein the second nodes are sequenced in the second physically contiguous locations according to respective depth levels of the second nodes within the decision tree;

wherein the first packed node has a first set of local addresses for linking the first parent node through first pointers to the first remaining nodes, and wherein the second packed node has a second set of local addresses for linking the second parent node through second pointers to the second remaining nodes.

20. The computer-readable medium of claim 19, wherein the first nodes descend from the second parent node, and wherein the method comprises: inserting the first packed node into the decision tree as one of the second remaining nodes, so that the second packed node includes the first packed node.

21. The computer-readable medium of claim 20, wherein the second physically contiguous locations include the first physically contiguous locations, in which the first nodes remain sequenced according to respective depth levels of the first nodes within the decision tree.

22. The computer-readable medium of claim 19, wherein grouping the second nodes includes: grouping the second nodes into the second packed node stored in the second physically contiguous locations, but only up to a particular number of the second physically contiguous locations.

23. The computer-readable medium of claim 22, wherein the memory is a system memory, and wherein the particular number is within a storage capacity of a cache memory of a processor device.

24. The computer-readable medium of claim 22, wherein the memory is a system memory, and wherein the particular number is within a storage capacity of a direct memory access ("DMA") memory of a processor device.

25. The computer-readable medium of claim 19, wherein the first nodes are sequenced in the first physically contiguous locations in a descending order of respective depth levels of the first nodes within the decision tree.

26. The computer-readable medium of claim 19, wherein the second physically contiguous locations are located within a same page of the memory.

27. The computer-readable medium of claim 19, wherein the first physically contiguous locations are located within a same line of the memory.

\* \* \* \* \*